United States Patent [19]

Ito

[11] 4,261,151
[45] Apr. 14, 1981

[54] STRUCTURE FOR COMBINING TWO BODIES

[75] Inventor: Keizo Ito, Ichinomiya, Japan

[73] Assignee: Toyoda Gosei Co., Ltd., Nagoya, Japan

[21] Appl. No.: 24,522

[22] Filed: Mar. 28, 1979

[30] Foreign Application Priority Data

Sep. 30, 1978 [JP] Japan ............................. 53-120495
Oct. 30, 1978 [JP] Japan ............................. 53-133500

[51] Int. Cl.³ .............................................. E04B 1/38
[52] U.S. Cl. ...................................... 52/507; 24/214; 52/511; 411/76; 411/337
[58] Field of Search ............... 52/507, 511, 717, 718; 85/5 R; 24/214, 73 FT, 73 PM, 73 PF, 213

[56] References Cited

U.S. PATENT DOCUMENTS

| 2,502,267 | 3/1950 | McPherson | 85/5 R |
| 3,678,797 | 7/1972 | Seckerson | 85/5 R |
| 3,777,052 | 12/1973 | Fegen | 85/5 R |
| 3,811,154 | 5/1974 | Lindeman | 85/5 R |
| 4,114,339 | 9/1978 | Ito | 52/507 |

FOREIGN PATENT DOCUMENTS

2227163 6/1972 Fed. Rep. of Germany ............ 85/5 R

*Primary Examiner*—Price C. Faw, Jr.
*Assistant Examiner*—Henry E. Raduazo

*Attorney, Agent, or Firm*—Armstrong, Nikaido, Marmelstein & Kubovcik

[57] ABSTRACT

Structure for combining an attaching member of integrally constituted engaging body to a receiving member having a rectangular attaching hole through a clip, wherein the device comprises said engaging body which includes a pair of supporting plates which project at both sides of an engaging hole with both surfaces of the supporting plates in the vertical direction, said engaging hole having one or two engaging pieces at one side or both sides at the inside of the engaging hole, said clip which can be inserted between the supporting plates and includes an elastic head of anchor-like shape, a pair of elastic wings which project from the base portion of the elastic head upward and downward and are curved towards the elastic head, and elastic arms which project from the base portion of the elastic head in the reverse direction to the elastic head, engaging stepped portion at the free end of the cantilever of the elastic head, a pawl at the top end of the elastic arm. The assembling state is constituted in that the clip is so attached to the attaching hole that it can not be moved forward and backward, and the receiving member is so supported that it can not be moved vertically, and further the clip is engaged with the engaging body so that the clip is gripped between the supporting plates and can not be moved forward and backward.

1 Claim, 22 Drawing Figures

STRUCTURE FOR COMBINING TWO BODIES

CROSS-REFERENCES TO RELATED APPLICATION

The present invention is directed to the improvement of U.S. Pat. No. 4,114,339 filed by the same applicant. Structure for combining two bodies according to the present invention improves the clip form of the U.S. Pat. No. 4,114,339 in that elastic wings are installed on upper and lower ends of an elastic head, and a receiving member is elastically gripped between an engaging recess and the elastic wing.

BACKGROUND OF THE INVENTION

1. Field of the Invention

The present invention relates to structure for combining two bodies, particularly suitable for attaching a plastic attaching member to a metallic receiving member and more particularly to useful structure for attaching plastic products having different thermal properties to metallic receiving member.

2. Description of the Prior Art

Due to difference in expansion rates between plastics and metal, when fully fitting the plastic attaching member into the metallic receiving member through screws, bolts and the like and combination being subjected to heat, plastic would deform or crack because they could not escape from expansion or contraction with full engagement of screws and bolts.

For instance, in case of attaching a plastic radiator grille 1 of an automobile to a metqal bracket 2 of the body it has been general means so far to combine them through screw 3 as illustrated in FIGS. 1 and 2.

Being subjected to heat as aforementioned, the plastic radiator grille 1 tends to expand longitudinally, but because of full engagement with the screw, it can not escape expansion and deforms downward or upward 1A at between engaging portions as shown in FIG. 2.

And, in case of full engaging structure by means of screws and the like, with the lapse of time, the screws get rusty and if requiring to remove the grille it will no longer possible to remove the grille with such a tool as a screw driver and will have to cut the screw with such tools as the drill and the like.

Moreover, the larger the grill, the more the number of attaching screws has been required in attaching the grille, thus requiring as much working number in combining and resulting in bad productivity.

SUMMARY OF THE INVENTION

In view of the aforementioned, the object of the present invention is to provide structure for combining two bodies, wherein a plastic attaching member can escape heat expansion and contraction thereof and be easily attached to a metallic receiving member without fear of deformation and breaking on account of heat.

Another object of the present invention is to provide structure for combing two bodies, wherein attachment or detachment of the attaching member with the receiving member can be done by one-touch action, fixing force after engagement does not differ from that of metallic screw means and there is no fear that detachment becomes impossible or the fine view is hurted with rust as that of screwing.

Another object of the present invention is to provide structure for combining two bodies, wherein two bodies, materials of which are not restricted to plastic attaching member and metallic receiving member as above described, can be easily combined through special clip and engaging mechanism, and the detachment does not occur by shock action.

Another object of the present invention is to provide structure for combining two bodies, wherein an attaching member can be attached to a receiving member without necessity of changing a clip corresponding to some degree of the thickness variation of the receiving member.

Other and further objects of the present invention will become apparent from the following description taken in connection with the accompanying drawings.

DESCRIPTION OF THE PREFERRED EMBODIMENTS

Figure 1:
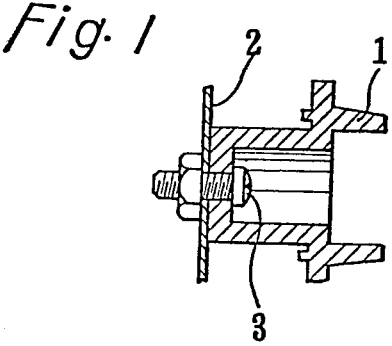
FIG. 1 is a sectional view showing conventional structure for combining a plastic radiator grille and a metal bracket.
Figure 2:
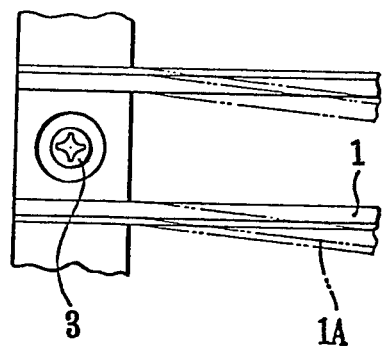
FIG. 2 is a partial elevation of FIG. 1.

Embodiments of the present invention will be explained by way of example in which a plastic radiator grille (attaching member) of an automobile is mounted to a metallic body bracket (receiving member) referring to accompanying drawings as follows:

EXAMPLE 1

This example will be illustrated in FIGS. 3 to 10.

A radiator grille 1 is integrally provided with an engaging body 10 of the same material as the grille 1 at suitable portion of the rear open surface. On a base portion 11 of the engaging body 10 is constituted an engaging hole 13, and a pair of supporting plates 13, 13 are constituted on both sides of the engaging holes 12 rearwards and project with a clearance 14 between both vertical surfaces of the supporting plates 13, 13. A pair of engaging pieces 15, 15 are constituted on both sides of the approximately center portion of the engaging hole 12. Said engaging hole 12 is of sideways H-shape, comprising parallel upper and lower portions and perpendicular center portion connecting the upper and lower portions. The supporting plates 13, 13 comprise the tapered top ends, stopper stepped portions 16 which are made thicker and widend upward and downward, stopper stepped portions 16, 16 and guide grooves 17, 17 which extend horizontally and forwards at the inside of the center of the top end.

The radiator grille 1 integrally provided with the engaging body 10 is mounted to a bracket 2 through a clip 20. The clip 20 is constituted as a flat form in vertical direction and so wide that it can be inserted to the clearance 14 of the engaging body 10 (between supporting plates 13, 13). The clip 20 comprises an elastic head 21, a pair of elastic wings 22, 22 which project from the elastic head 21 upward and downward, and a pair of elastic arms 23, 24 which project from the center of the base portion of the elastic head 21 in the reverse direction to the elastic head 21. The elastic head 21 is of anchor-like form. A center supporting shaft 21a of the elastic body 21 is a band extending horizontally. A pair of cantilevers 21b, 21b are constituted on the top end of the center supporting shaft 21a and spread out vertically towards the base portion of the center supporting shaft 21 (towards the elastic arms 23, 24). The cantilevers 21b, 21b can be bent towards the center supporting shaft 21a. Engaging stepped portions 21c, 21c are constituted respectively on upper and lower outside surfaces of the free ends of the cantilevers 21b, 21b. A pair of elastic wings 22, 22 project upwards and downwards from the base portion of the center supporting shaft 21a, and the top ends thereof are bent towards the elastic head 21. Supporting protrusions 28, 28 are constituted on the center curved portions of the elastic wings 22, 22 respectively on the sides of the elastic arms 23, 24. On right and left sides of the center supporting shaft 21a of the elastic head 21 are constituted guide protruding stripes 25, 25 which can be fitted to said guide grooves 17, 17. A pair of elastic arms 23, 24 branch from the base portion of the center supporting shaft 21a of the elastic head 21, and project horizontally in the reverse direction to the elastic head 21. Intermediate portion of the upper elastic arm 23 is made a narrowed portion 26, and the top end thereof is provided with a pawl 27.

Figure 3:
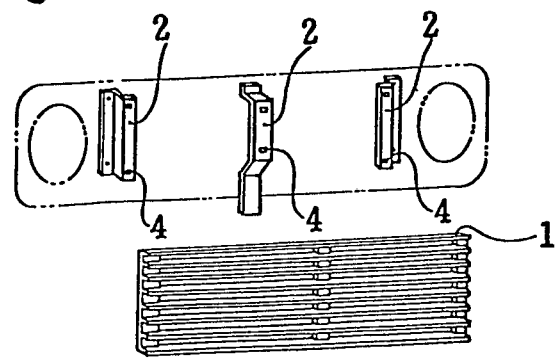
FIG. 3 is a separating perspective view showing a radiator grille and a body bracket.
Figure 4:
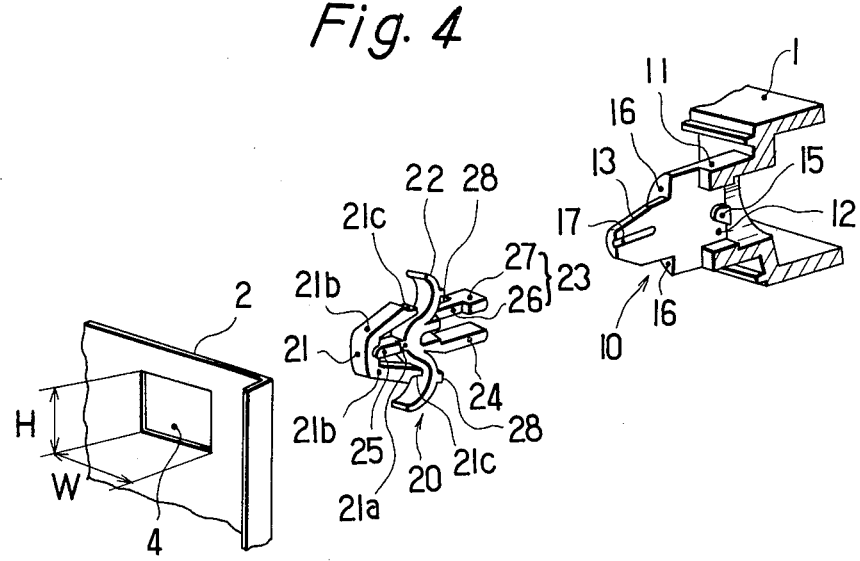
FIG. 4 is a separating rear perspective view showing structure of Example 1 of the present invention.
Figure 5:
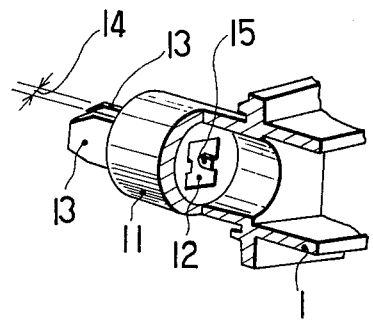
FIG. 5 is a partly cutaway front perspective view of an engaging body of Example 1.

Referring to FIG. 3, a bracket 2 of a car body is provided with an attaching hole 4 rearward of the radiator grille 1 and opposite to the engaging body 10 integrally constituted with said radiator grille 1. The supporting plate 13 of the engaging body 10 can be inserted to said hole 4. The hole 4 has a height H approximately equal to that of the supporting plate 13, and a width W at least longer than the height H.

Now, assemblying of the embodiment will be explained.

First the side of the elastic arms 23, 24 of the clip 20 is inserted to the clearance 14 of the engaging body 10 integrally constituted with the radiator grille 1. The elastic arms 23, 24 are at first bent upwards and downwards and opened with each other by the taper surface of the engaging pieces 15, 15. When the pawl 27 passes through the engaging hole 12, the opened elastic arms 23, 24 return to the original position thereby the narrowed portion 26 is fitted between the engaging pieces 15, 15 by means of spring action. Then, the pawl 27 is engaged to the engaging pieces 15, 15 and the guide protruding stripe 25 is fitted to the guide groove 17, so that the clip 20 is rigidly attached to the engaging body 10 in the contacting state of the supporting protrusions 28, 28 of the elastic wing 22 with the stopper stepped portions 16, 16.

Next the elastic head 21 of the clip 20 is forcedly pushed into the hole 4 of the bracket 2 at the state of contacting it to upper and lower lines of the hole 4. Then, the elastic head 21 (cantilevers 21b, 21b) is bent inward and inserted to the hole 4. In this state, although the top ends of the elastic wings 22, 2 contact to the front surface of the bracket 2 so as to obstruct the pushing of the clip 20 into the hole 4, further forced pushing of the clip 20 allows the engaging stepped portion 21a to be engaged with the upper and lower lines of the hole 4 so that the elastic head 21 returns to the original state.

Then the engaging body 10 and the clip is so connected that forward and backward movement is obstructed by means of engaging of the engaging stepped portions 21c, 21c with the hole 4 and pushing of the elastic wings 22, 22 from the forward surface of the hole 4. The supporting plates 13, 13 are inserted to the hole 4, thereby the radiator grille 1 is engaged with the engaging body 10 in the state of obstructing the vertical movement of the radiator grille 1. Thus the radiator grille is securely held to the bracket 2. Since the bracket 2 is elastically gripped between the engaging stepped portion 21c and the elastic wing 22, variation of the thickness of the bracket 2 can be covered. Furthermore, since the guide protruding stripe 25 is fitted to the guide groove 17 of the engaging body 10, the clip 20 is not loosened at the violent shock so that the clip 20 is prevented from being broken.

After the assembling, the radiator grille 1 is not detached from the bracket 2, as long as the elastic head 21 or the elastic arm 23 is not forcedly deformed. Since the pawl 27 of the elastic arm 23 is engaged with the engaging pieces 15, 15 at the center, pawl 27 is not detached from the engaging pieces 15, 15 by pulling the radiator grille 1 forward, as long as the elastic arm 23 is not deformed in upward direction with respect to the pulling strength or the pawl 27 or the engaging pieces 15, 15 is not broken.

When the radiator grille 1 is expanded or contracted in the longitudinal direction by means of thermal action, the engaging body 10 is moved together with the clip 20 within the hole 4 longitudinally and the displacement amount is covered. Therefore the radiator grille 1 is neither deformed nor broken as a rigid tightening by screws and the like.

Figure 6:
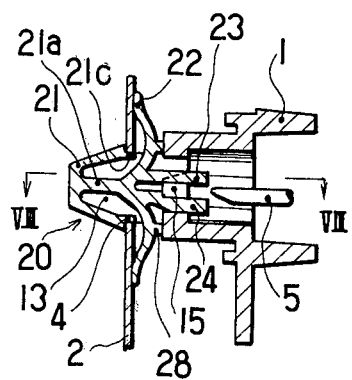
FIG. 6 is a sectional view showing assembling state of Example 1.
Figure 7:
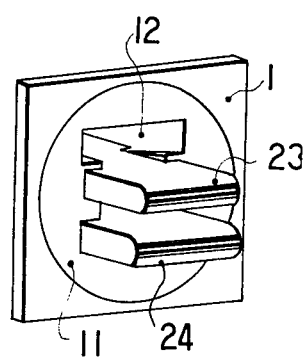
FIG. 7 is a perspective view showing assembling state of a clip and the base portion of the engaging body of Example 1.
Figure 8:
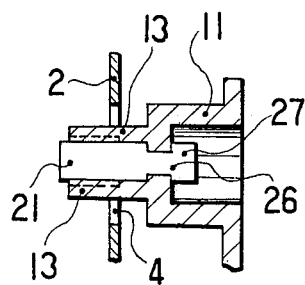
FIG. 8 is a sectional view through line VIII to VIII of FIG. 6.

Referring to FIG. 6, in order to detach the radiator grille 1 from the bracket 2, a tool such as a minus driver 5 is inserted between elastic wings 23, 24 and then turned in right or left direction or twisted in up or down direction so as to enlarge the distance between the elastic wings 23, 24. In this state, the radiator grille 1 is pulled forward and the engagement between the engaging hole 12 and the pawl 27 is released in the engaging body 10, thereby the radiator grille 1 can be detached.

Figure 9:
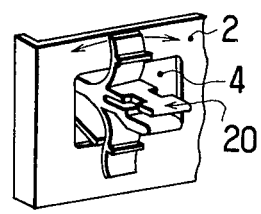
FIG. 9 is a perspective view illustrating detaching state of the clip in FIG. 4.
Figure 10:
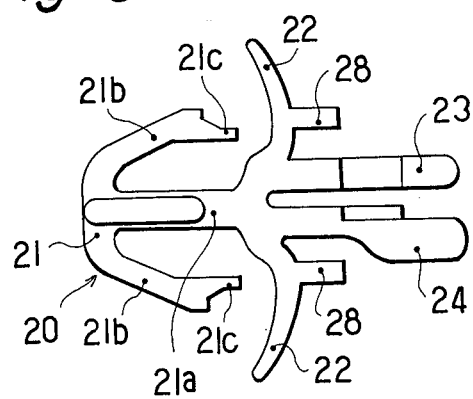
FIG. 10 is an enlarged side view of FIG. 4.

The clip 20 which is left within the bracket 2 is readily removed from the hole 4 by bending the elastic body 21 inward. Otherwise as shown in FIG. 9, if the clip 20 is turned by 90° and brought down, the clip 20 is also readily removed from the hole 4 since the width W of the hole 4 is larger than that of the elastic head 21 in upper or lower position.

In order to attach the radiator grille 1 to the bracket 2 again, the clip 20 is attached first to the engaging body 10 and then to the bracket 2 in the same manner as above described, or the clip 20 is attached to the hole 4 and then the engaging body 10 is fitted to the clip 20. In the latter manner, the position of each clip 20 must be previously adjusted.

Figure 11:
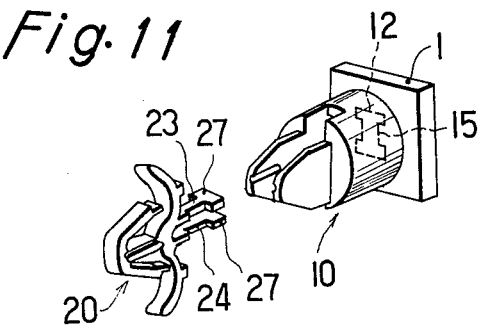
FIG. 11 is a perspective view of a clip and an engaging body with pawls arranged on both elastic arms in Example 1.
Figure 12:
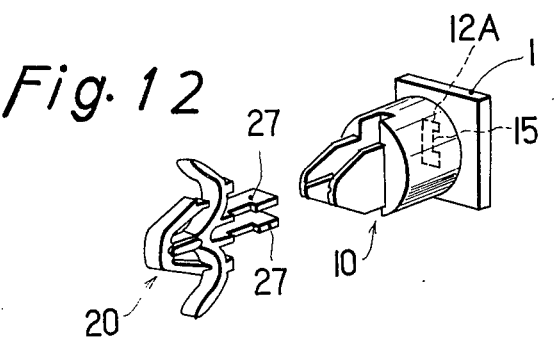
FIG. 12 is a perspective view of a clip and an engaging body with an engaging piece at one side of an engaging hole in Example 1.

In addition, in the above example the pawl 27 may be arranged on both elastic arms 23, 24 as illustrated in FIG. 11, or the engaging piece 15 is arranged on one side and an engaging hole 12A may be made in C-form as illustrated in FIG. 12.

Figure 13:
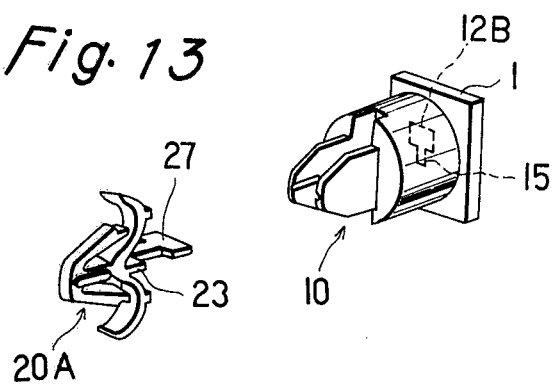
FIG. 13 is a perspective view of a clip and an engaging body with single elastic arm in Example 1.
Figure 14:
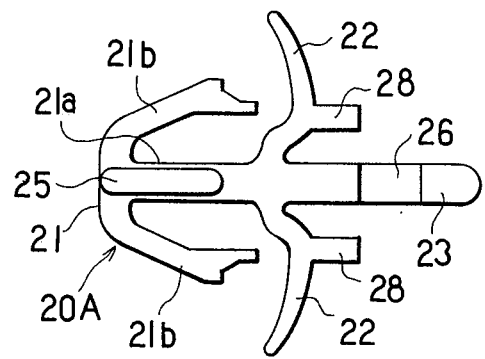
FIG. 14 is an enlarged side view of the clip in FIG. 13.
Figure 15:
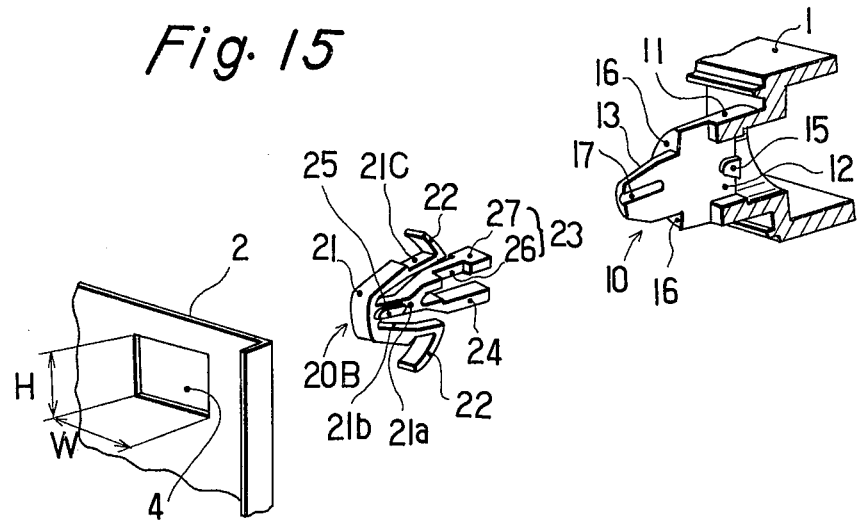
FIG. 15 is a separating rear perspective view showing Example 2 of the present invention.
Figure 16:
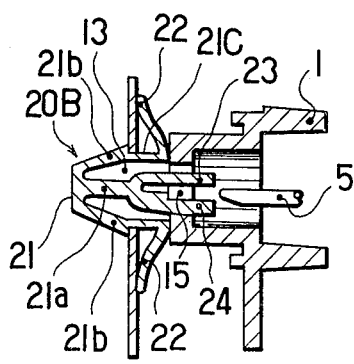
FIG. 16 is a sectional view illustrating assembling state of Example 2.
Figure 17:
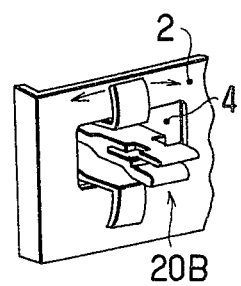
FIG. 17 is a perspective view illustrating detachment of a clip in Example 2.
Figure 18:
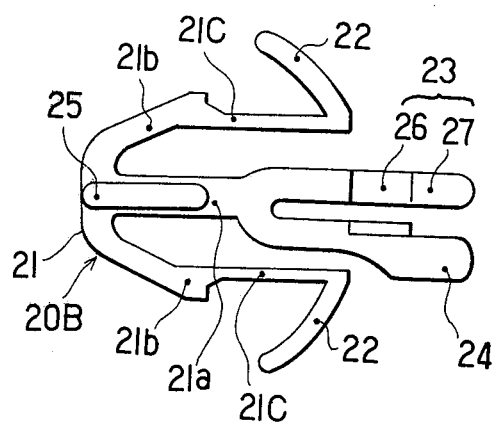
FIG. 18 is an enlarged side view of a clip in Example 2.

Further, referring to FIGS. 13-14, a clip 20A may be provided with single elastic arm 23 comprising the pawl 27, and an engaging hole 12B of the engaging body 10 is made in T-form.

EXAMPLE 2

This example will be illustrated in FIGS. 15-22.

The second example is different from the first example in the protruding position of the elastic wing of the clip.

In the second example, engaging stepped portions 21c, 21c of cantilevers 21b, 21b of an elastic head 21 in a clip 20B extend respectively from engaging stepped portions 21c, 21c towards the base portion of elastic levers 23, 24. Elastic wings 22, 22 project respectively from the free ends of said engaging stepped portions 21c, 21c of the cantilevers 21b, 21b upward and downward, and the top ends of the elastic wings 22, 22 are curved towards the elastic head 21.

Using manner of the second example is quite similar to the first example.

Figure 19:
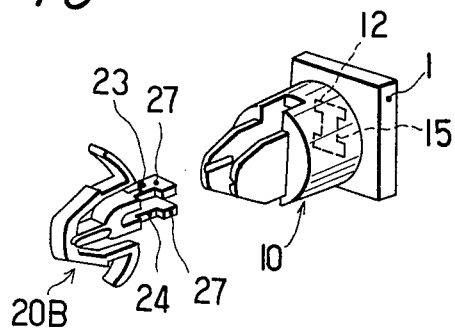
FIG. 19 is a perspective view of a clip and an engaging body with pawls arranged on both elastic arms in Example 2.
Figure 20:
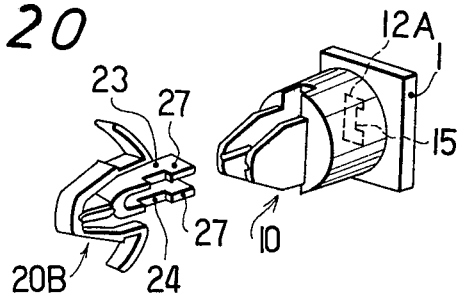
FIG. 20 is a perspective view of a clip and an engaging body with an engaging piece at one side of an engaging hole in Example 2.

In addition, in the above example the pawl 27 may be arranged on both elastic arms 23, 24 as illustrated in FIG. 19, or the engaging piece 15 is arranged on one side and an engaging hole 12A may be made in C-form, comprising parallel upper and lower portions and perpendicular intermediate portion connecting the upper and lower portions at one side, as illustrated in FIG. 20.

Figure 21:
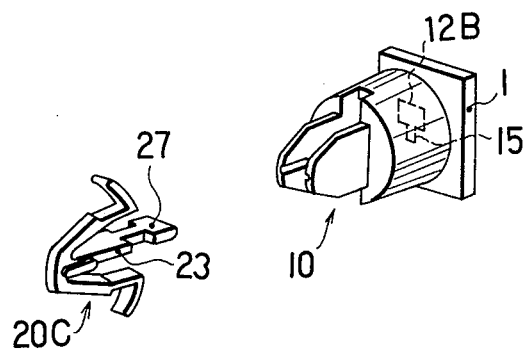
FIG. 21 is a perspective view of a clip and an engaging body with single elastic arm in Example 2.
Figure 22:
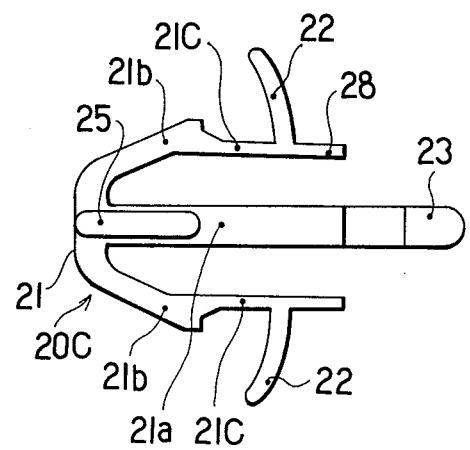
FIG. 22 is an enlarged side view of a clip showing another example similar to the clip in FIG. 21.

Further, referrring to FIGS. 21-22, a clip 20C may be provided with single elastic arm 23 comprising the pawl 27, and an engaging hole 12B of the engaging body 10 is made in T-form, comprising a horizontal first portion and a second portion perpendicular to the first portion, and the free ends of cantilevers 21b, 21b may project towards the elastic wing so as to constitute a protrusion 28.

As aforementioned, although description has been made out with combination of the plastic radiator grille and the bracket as metal construction as an example, this, of course, can be effectively applied to various plastic construction in cars and others. And, although particularly with the combination of plastic construction and metallic receiving construction effective combining construction is available in absorbing expansion and contraction actions due to heat passage, it is obvious from the aforementioned construction that two bodies are not restricted in material.

What I claim is:

1. A device for combining two bodies wherein an engaging member of integrally constituted engaging body is attached to a receiving member having a rectangular attaching hole through a clip, said device comprising:

(a) said engaging body including an engaging hole at the base portion, a pair of supporting plates having vertical surfaces and projecting on both sides of the engaging hole rearward having a clearance between both vertical surfaces, said engaging hole having one or more engaging pieces at one side or both sides inward, and each of the supporting plates comprising a tapered top end and a stopper stepped portion defining a sholder; and (b) said clip which is so wide to be inserted between said supporting plates and includes an elastic head, a pair of free elastic wings which project from the base portion of said elastic head upward and downward and curved towards the elastic head, and one or two elastic arms which project from the center of the base portion of said elastic head in the reverse direction to the elastic head, said elastic head being of anchor-like form and having a pair of cantilevers which are constituted on the top end of the center supporting shaft and spread out vertically towards the elastic arm, said cantilevers being adapted to be bent towards the center supporting shaft, engaging stepped portions being constituted respectively on upper and lower outside surfaces of the free ends of the cantilevers, the protrusion of said elastic wings beginning at the free ends of the cantilevers, and at least one of said elastic arms including a narrowed intermediate portion and a pawl at the top end; wherein in an assembled state, the upper and lower ends of said attaching hole is elastically gripped between said engaging stepped portion and said elastic wing, whereby said clip is to attached to said attaching hole that the clip can not be moved forward and backward, and said supporting plate is inserted to said attaching hole, whereby said receiving member is so supported to said engaging body that the receiving member can not be moved vertically, and the narrowed portion of said elastic arm is fitted to the clearance between said engaging pieces with spring action and, at the same time, said pawl is engaged with said engaging piece, whereby said clip is engaged with said engaging piece so that the clip is gripped between the supporting plates and can not be moved forward and backward.

* * * * *